(12) United States Patent
Yamaguchi

(10) Patent No.: US 7,414,666 B2
(45) Date of Patent: Aug. 19, 2008

(54) PORTABLE DEVICE HAVING EXPOSURE-ADJUSTABLE IMAGE PICK-UP UNIT AND EXPOSURE ADJUSTING DEVICE

(75) Inventor: Kazunari Yamaguchi, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 792 days.

(21) Appl. No.: 10/622,697

(22) Filed: Jul. 21, 2003

(65) Prior Publication Data

US 2004/0017505 A1 Jan. 29, 2004

(30) Foreign Application Priority Data

Jul. 24, 2002 (JP) ............... 2002-215048

(51) Int. Cl.
H04N 5/222 (2006.01)
H04N 5/235 (2006.01)
H04N 5/238 (2006.01)

(52) U.S. Cl. ............... 348/371; 348/362; 348/364

(58) Field of Classification Search ........... 348/371, 348/362, 364, 370, 221.1, 296
See application file for complete search history.

(56) References Cited

U.S. PATENT DOCUMENTS

| 5,438,367 A * | 8/1995 | Yamamoto et al. ......... 348/371 |
| 5,504,584 A | 4/1996 | Soeda |
| 5,860,029 A | 1/1999 | Ichikawa et al. |
| 6,069,659 A | 5/2000 | Nakajima |
| 6,167,022 A | 12/2000 | Fukui |
| 6,272,292 B1 | 8/2001 | Iwasaki et al. |
| 6,351,606 B1 * | 2/2002 | Yamazaki ................ 396/155 |
| 6,546,203 B2 * | 4/2003 | Hofer .................... 348/371 |
| 6,654,062 B1 * | 11/2003 | Numata et al. ............ 348/362 |
| 7,092,029 B1 * | 8/2006 | Medwick et al. .......... 348/371 |
| 2001/0019364 A1 * | 9/2001 | Kawahara ................ 348/364 |
| 2002/0063783 A1 | 5/2002 | Kurase |
| 2002/0067422 A1 | 6/2002 | Miura et al. |
| 2002/0197071 A1 | 12/2002 | Hofer |
| 2003/0107669 A1 * | 6/2003 | Ito et al. ................ 348/370 |
| 2004/0066461 A1 | 4/2004 | Maeda |

FOREIGN PATENT DOCUMENTS

| EP | 1318669 A1 | 6/2003 |
| GB | 2 354 832 A | 4/2001 |
| JP | 58-83864 U | 6/1983 |

(Continued)

Primary Examiner—Nhan T Tran
(74) Attorney, Agent, or Firm—Birch, Stewart, Kolasch & Birch, LLP

(57) ABSTRACT

A portable camera-phone has a strobe consisting of LEDs emitting light with a determined quantity of light emission, as an auxiliary light source for image pick-up of an object by a camera. In an image pick-up mode, the light emission quantity is adjusted repeatedly until a total exposure value matches an optimal exposure value, based on a difference between a total exposure value of an image signal output from the camera with the light emission quantity determined last time and a total exposure value when emission is OFF. Therefore, in the image pick-up mode, two reference values are used for determining the light emission quantity to have the total exposure value match the optimal exposure value, and hence the light emission quantity can be determined with high accuracy. As a result, an optimal exposure level can be obtained with high accuracy.

18 Claims, 9 Drawing Sheets

FOREIGN PATENT DOCUMENTS

| | | | |
|---|---|---|---|
| JP | 58-147722 | A | 9/1983 |
| JP | 60-6930 | A | 1/1985 |
| JP | 6-222429 | A | 8/1994 |
| JP | 07-072536 | * | 3/1995 |
| JP | 9-61911 | A | 3/1997 |
| JP | 11-119288 | A | 4/1999 |
| JP | 11205666 | | 7/1999 |
| JP | 2000-122128 | A | 4/2000 |
| JP | 2000-156833 | A | 6/2000 |
| JP | 2000-187266 | A | 7/2000 |
| JP | 2000-267151 | A | 9/2000 |
| JP | 2001-230970 | A | 8/2001 |
| JP | 2001-343579 | A | 12/2001 |
| JP | 2002-162997 | A | 6/2002 |

* cited by examiner

FIG.8

| BRIGHTNESS BETWEEN CAMERA AND OBJECT | RANGE OF TOTAL EXPOSURE VALUE OF IMAGE TAKEN BY CAMERA |
|---|---|
| DARK | 0~18 |
| OPTIMAL | 19~21 |
| BRIGHT | 22~70 |

| DF | LM |
|---|---|
| 0~10 | 5(MAX) |
| 11~40 | 4 |
| 41~50 | 3 |
| 51~65 | 2 |
| 66~70 | 1(MIN) |

PORTABLE DEVICE HAVING EXPOSURE-ADJUSTABLE IMAGE PICK-UP UNIT AND EXPOSURE ADJUSTING DEVICE

This nonprovisional application claims priority under 35 U.S.C. 119(a) on Patent Application No(s). 2002-215048 filed in JAPAN on Jul. 24, 2002, which is(are) herein incorporated by reference.

BACKGROUND OF THE INVENTION

1. Field of the Invention

The present invention relates to a portable device having an image pick-up unit and to an exposure adjusting device and, more specifically, it relates to a portable device having an image pick-up unit that adjusts brightness of an object (hereinafter referred to as exposure) utilizing an auxiliary light source, as well as to an exposure adjusting device.

2. Description of the Background Art

When an object is picked-up by a camera, exposure level is adjusted as described in Japanese Utility Model Laying-Open No. 58-83864. This laid-open application discloses a light adjusting device adjusting quantity of light emitted by an auxiliary light source for image pick-up. The light adjusting device receives light reflected from the object and adjusts the quantity of light emitted by the light source such that the exposure level detected from an image signal based on a photo reception signal attains to an appropriate level.

Japanese Patent Laying-Open No. 6-222429 discloses a strobe that automatically adjusts light emission of a flashing discharge tube. Specifically, in accordance with the diaphragm stop at the time of image pick-up, data representing quantity of strobe light emission corresponding to appropriate exposure is set, and the set data is input to one side of a comparator. To the other side of the comparator, data representing a result of integration of a current in accordance with the level of the reflected light from the object is input. When the data at the two inputs of the comparator match, emission of light from the flashing discharge tube is stopped.

Japanese Patent Laying-Open No. 2000-267151 discloses a camera that controls the quantity of stroboscopic light emission. According to this laid-open application, before a normal light emission by a strobe for image pick-up, a preliminary light emission of the strobe is performed to adjust exposure, and in accordance with the result of evaluation of the light reflected from the object at the time of the preliminary light emission, the level of the normal light emission of the strobe is determined.

Japanese Patent Laying-Open No. 2001-230970 discloses an apparatus that picks-up an image of an object in accordance with image pick-up conditions defined by the position of the object. Specifically, at the time of image pick-up, distance to the object is measured, for example, by a distance measuring sensor, and based on the measured distance, various conditions including the quantity of light emission by a strobe are determined.

The light adjusting device disclosed in Japanese Utility Model Laying-Open No. 58-83864 is fixedly provided in connection with a television camera fixedly installed at an entrance for picking-up an image of a visitor. Therefore, the quantity of light emission is adjusted simply to compensate for underexposure, while the distance between the light adjusting device and the object and the distance between the camera and the object do not vary. Therefore, it is impossible by the technique described in this reference to adjust the quantity of light emission while linearly following variation in the distance between the camera and the object.

According to Japanese Patent Laying-Open No. 2000-122128, quantity of light entering an imaging device is controlled by arranging an ND filter in front of the imaging device. By this arrangement, it becomes possible to effectively change the distance between the object and the imaging device, though the distance is actually kept constant, and in this manner, the quantity of strobe light emission is adjusted.

Japanese Patent Laying-Open No. 60-6930 discloses a method of controlling exposure of a camera. Specifically, exposure of a camera is adjusted by using data of a range that can be regarded as appropriate exposure of a film, data of film sensitivity and data of light intensity from an object.

As described above, none of the techniques disclosed in Japanese Patent Laying-Open Nos. 2000-122128, 60-6930 and Japanese Utility Model Laying-Open No. 58-83864 is capable of adjusting quantity of light emission while linearly following the change in distance between the camera and the object. Therefore, it is not possible to pick-up an image with optimal exposure level while linearly following the change in distance between the camera and the object.

According to Japanese Patent Laying-Open No. 6-222429, the quantity of strobe light emission is determined such that the optimal exposure is attained in accordance with the diaphragm stop at the time of image pick-up. Therefore, when the distance between the camera and the object happens to change as the camera moves, for example, the optimal exposure set in accordance with the diaphragm stop would result in under-exposure or over-exposure.

The technique disclosed in Japanese Patent Laying-Open No. 2000-267151 has a problem that, when the camera moves and the distance between the object and the camera changes between the preliminary light emission and the normal light emission, optimal exposure level would not be attained by the level of normal strobe light emission determined immediately before the movement.

According to Japanese Patent Laying-Open No. 2001-230970, image pick-up conditions including the quantity of light emission are determined based on the distance to the object detected by a distance measuring sensor. Therefore, the structure of the device becomes complicated by the incorporation of the sensor, and the cost of the device also increases.

SUMMARY OF THE INVENTION

An object of the present invention is to provide a portable device having an image pick-up unit that can attain appropriate exposure level and an exposure adjusting device.

According to an aspect, the above described object of the present invention is attained by a portable device having an image pick-up unit picking-up an image and outputting image information, including a light source emitting light to an object, a control unit controlling emission of light by the light source based on the quantity of light emission in an image pick-up mode, and an exposure detecting unit detecting the exposure level based on the image information.

The control unit includes a light emission quantity determining unit, and a comparing unit comparing an exposure level detected by the exposure detecting unit with the light source emitting light based on the quantity of light emission determined by the light emission quantity determining unit with an exposure level detected by the exposure detecting unit with the light source not emitting light. Based on the result of comparison, the light emission quantity determining unit determines the quantity of light emission.

Therefore, every time the quantity of light emission is determined, the quantity is determined with reference to the result of comparison between the exposure level when the light source emits light with the quantity of light emission as determined for the last time and the exposure level when the light source does not emit light, that is, with reference to two exposure levels.

Therefore, it follows that there are two reference values to determine the quantity of light emission, and hence, the quantity of light emission can be determined with high accuracy. Further, the two reference values are relative (opposing) values, that is, the exposure levels with and without light emission from the light source. Therefore, the quantity of light emission can be determined with high accuracy, and the exposure level can be attained with high accuracy.

Preferably, in the portable device having the image pick-up unit described above, the comparing unit compares the exposure level detected by the exposure detecting unit with the light source emitting light with the quantity of light emission determined by the light emission quantity determining unit with the exposure level detected by the exposure detecting unit with the light source not emitting light, and detects a difference. The light emission quantity determining unit determines the quantity of light emission to have the exposure level attain the optimal level, based on the difference detected by the comparing unit.

Therefore, every time the quantity of light emission is determined, the quantity is determined with reference to the result of comparison between the exposure level when the light source emits light with the quantity of light emission as determined for the last time with the exposure level when the light source does not emit light, that is, with reference to two exposure levels.

Therefore, it follows that there are two reference values to determine the quantity of light emission, and hence, the quantity of light emission to have the exposure level attain the optimal level can be determined with high accuracy. As a result, the optimum exposure level can be obtained with high accuracy. Further, the two reference values are relative (opposing) values, that is, the exposure levels with and without light emission from the light source. Therefore, the quantity of light emission can be determined with high accuracy, and the exposure level can be attained with high accuracy.

The optimal level mentioned above is the target exposure level related to the image information. Therefore, in the image pick-up mode, the target exposure level can be attained with high accuracy.

Preferably, in the portable device having the image pick-up unit described above, while the exposure level detected by the exposure detecting unit when the light source emits light with the quantity of light emission determined by the light emission quantity determining unit and the exposure level detected immediately thereafter by the exposure detecting unit with the light source not emitting light do not match the optimal level, the comparing unit and the light emission quantity determining unit are repeatedly activated.

Therefore, in the image pick-up mode, until the detected exposure level matches the optimal level, a series of operations is repeated, in which light is emitted with the quantity of light emission as determined last time, emission of light is stopped immediately thereafter, and the quantity of light emission is determined.

Therefore, in the image pick-up mode, even when the distance between the object and the image pick-up unit or the portable device varies, or when the brightness between the object and the image pick-up unit varies, the quantity of light emission can be determined following the variation. Therefore, it becomes possible to have the exposure level always matching the optimal level.

Preferably, the control unit described above further includes a starting state setting unit setting the light source to non-emission state at the start of the image pick-up mode, and a start level determining unit determining whether the exposure level detected by the exposure detecting unit in the non-emission state set by the starting state setting unit matches the optimal level or not. When it is determined to be not matching by the start level determining unit, the light emission quantity determining unit and the comparing unit are activated.

Therefore, before the repetition of a series of operations in which light is emitted with the quantity of light emission as determined last time, emission of light is stopped immediately thereafter, and the quantity of light emission is determined, the light source is set to the non-emission state, whether the exposure level matches the optimal level or not is determined, and when it is determined to be not matching, the light emission quantity determining unit and the comparing unit are activated to execute the repetition of the series of operations.

Accordingly, when the brightness between the object and the image pick-up unit is sufficient and the exposure level matches the optimal level even without emission of light, the above described series of operations is omitted. As a result, wasteful power consumption associated with the light emission can be avoided.

Preferably, in the portable device having the image pick-up unit described above, when it is determined by the start level determining unit that the level does not match, the light emission quantity determining unit determines the quantity of light emission to be the maximum quantity that can be attained by the light source.

Therefore, at the start of the repetition of the series of operations in which light is emitted with the quantity of light emission as determined last time, emission of light is stopped immediately thereafter, and the quantity of light emission is determined, the light source emits light with the maximum quantity of light. Therefore, it becomes possible to quickly attain the exposure level matching the optimal level, when an image is to be picked-up in the dark.

Preferably, the portable device having the image pick-up unit further has a storing unit for storing image data corresponding to the image information, and when the exposure level detected by the exposure detecting unit matches the optimal level, the image data is stored in the storing unit.

Therefore, in the image pick-up mode, of the image information output from the image pick-up unit, image data corresponding to that image information which is output when the detected exposure level matches the optimal level is stored in the storing unit. Therefore, the image data of which exposure level matches the optimal level can be stored and held in the storing unit.

Preferably, the portable device having the image pick-up unit described above further has a shutter key operated from outside to instruct storage of image data to the storing unit, and when the exposure level detected by the exposure detecting unit matches the optimal level, whether the shutter key is operated or not is determined.

Therefore, even when the shutter key is operated erroneously, whether the shutter key is operated or not is determined only when the exposure level matches the optimal level. Therefore, storage of the image data having exposure level not matching the optimal level in the storing unit can surely be avoided.

Preferably, in the portable device having an image pick-up unit described above, the image pick-up mode includes a close-up mode and a non-close-up mode that are switchable.

In the image pick-up mode, a series of operations is repeated until the detected exposure level matches the optimal level, in which light is emitted with the quantity of light emission as determined last time, emission of light is stopped immediately thereafter, and the quantity of light emission is determined. Therefore, even when in the image pick-up mode the close-up mode and the non-close-up mode are switched and the distance between the object and the image pick-up unit varies, the quantity of light emission can be determined following the variation. Therefore, it becomes possible to have the exposure level always matching the optimal level.

Preferably, the portable device having the image pick-up unit described above further includes a display unit displaying an image in accordance with the image information.

Therefore, by monitoring the image displayed on the display unit in the image pick-up mode, it is possible for the user to quickly confirm whether the exposure level matches the optimal level or not. Further, it is possible to operate the shutter key when it is confirmed by the monitor image that the exposure level matches the optimal level. Further, when the monitor image has the optimal exposure level, it is easy to confirm whether the image is in focus or out of focus. Accordingly, it becomes easier to accurately switch between the close-up mode and the non-close-up mode.

Preferably, in the portable device having the image pick-up unit described above, the light emission quantity determining unit includes a table in which light emission quantities are registered for a plurality of differences, and based on the difference detected by the comparing unit, the table is looked-up and the corresponding light emission quantity is read.

Therefore, the light emission quantity determining unit determines the light emission quantity by looking-up the table and reading the corresponding quantity. Accordingly, the light emission quantity can be determined quickly in a simple manner.

According to another aspect, the present invention provides an exposure adjusting device including an exposure detecting unit detecting an exposure level based on image information obtained by picking-up an image of an object, a light emission quantity determining unit determining quantity of light emission by a light source provided in advance for emitting light to the object in an image pick-up mode, and a comparing unit comparing an exposure level detected by the exposure detecting unit with the light source emitting light with the quantity of light emission as determined by the light emission quantity determining unit with an exposure level detected by the exposure detecting unit with the light source not emitting light. The light emission quantity determining unit determines the quantity of light emission based on the result of comparison by the comparing unit.

Therefore, every time the quantity of light emission is determined, the quantity is determined with reference to the result of comparison between the exposure level with the light source emitting light with the quantity of light emission as determined for the last time and the exposure level with the light source not emitting light, that is, with reference to two exposure levels.

Therefore, it follows that there are two reference values to determine the quantity of light emission, and hence, the quantity of light emission to attain appropriate exposure level can be determined with high accuracy. Further, the two reference values are relative (opposing) values, that is, the exposure levels with and without light emission from the light source. Therefore, the quantity of light emission can be determined with high accuracy, and the exposure level can be attained with high accuracy.

Preferably, in the exposure adjusting device described above, the comparing unit compares the exposure level detected by the exposure detecting unit with the light source emitting light with the quantity of light emission determined by the light emission quantity determining unit with the exposure level detected by the exposure detecting unit with the light source not emitting light, and detects a difference. The light emission quantity determining unit determines the quantity of light emission to have the exposure level attain the optimal level based on the difference detected by the comparing unit.

Therefore, every time the quantity of light emission is determined, the quantity is determined with reference to the result of comparison between the exposure level with the light source emitting light with the quantity of light emission as determined for the last time with the exposure level with the light source not emitting light, that is, with reference to two exposure levels.

Therefore, it follows that there are two reference values to determine the quantity of light emission, and hence, the quantity of light emission to have the exposure level attain the optimal level can be determined with high accuracy. As a result, the optimum exposure level can be obtained with high accuracy. Further, the two reference values are relative (opposing) values, that is, the exposure levels with and without light emission from the light source. Therefore, the quantity of light emission can be determined with high accuracy, and the exposure level can be attained with high accuracy.

The optimal level mentioned above is the target exposure level related to the image information. Therefore, in the image pick-up mode, the target exposure level can be attained with high accuracy.

Preferably, in the exposure adjusting device described above, while the exposure level detected by the exposure detecting unit with the light source emitting light with the quantity of light emission determined by the light emission quantity determining unit and the exposure level detected immediately thereafter by the exposure detecting unit with the light source not emitting light do not match the optimal level, the comparing unit and the light emission quantity determining unit are repeatedly activated.

Therefore, in the image pick-up mode, until the detected exposure level matches the optimal level, a series of operations is repeated, in which light is emitted with the quantity of light emission as determined last time, emission of light is stopped immediately thereafter, and the quantity of light emission is determined.

Therefore, in the image pick-up mode, even when the distance to the object varies, or when the brightness of the space to the object varies, the quantity of light emission can be determined following the variation. Therefore, it becomes possible to have the exposure level always matching the optimal level.

Preferably, the exposure adjusting device described above further includes a starting state setting unit setting the light source to non-emission state at the start of the image pick-up mode, and a start level determining unit determining whether the exposure level detected by the exposure detecting unit in the non-emission state set by the starting state setting unit matches the optimal level or not. When it is determined to be not matching by the start level determining unit, the light emission quantity determining unit and the comparing unit are activated.

Therefore, before the repetition of a series of operations in which light is emitted with the quantity of light emission as determined last time, emission of light is stopped immediately thereafter, and the quantity of light emission is determined, the light source is set to the non-emission state, whether the exposure level matches the optimal level or not is determined, and when it is determined to be not matching, the light emission quantity determining unit and the comparing unit are activated to execute the repetition of the series of operations.

Accordingly, when the brightness of the space to the object is sufficient and the exposure level matches the optimal level even without emission of light, the above described series of operations is omitted. As a result, wasteful power consumption associated with the light emission can be avoided.

Preferably, in the exposure adjusting device described above, when it is determined by the start level determining unit that the level does not match, the light emission quantity determining unit determines the quantity of light emission to be the maximum quantity that can be attained by the light source.

Therefore, at the start of the repetition of the series of operations in which light is emitted with the quantity of light emission as determined last time, emission of light is stopped immediately thereafter, and the quantity of light emission is determined, the light source emits light with the maximum quantity of light. Therefore, it becomes possible to quickly attain the exposure level matching the optimal level, when an image is to be picked-up in the dark.

Preferably, in the exposure adjusting device described above, the image pick-up mode includes a close-up mode and a non-close-up mode that are switchable.

In the image pick-up mode, a series of operations is repeated until the detected exposure level matches the optimal level, in which light is emitted with the quantity of light emission as determined last time, emission of light is stopped immediately thereafter, and the quantity of light emission is determined. Therefore, even when in the image pick-up mode the close-up mode and the non-close-up mode are switched and the distance between the object and the image pick-up unit varies, the quantity of light emission can be determined following the variation. Therefore, it becomes possible to have the exposure level always matching the optimal level.

Preferably, the light emission quantity determining unit includes a table in which light emission quantities are registered corresponding to a plurality of differences, and based on the difference detected by the comparing unit, the table is looked-up and the corresponding light emission quantity is read.

Therefore, the light emission quantity determining unit determines the light emission quantity by looking-up the table and reading the corresponding quantity. Accordingly, the light emission quantity can be determined quickly in a simple manner.

According to a still further aspect, the present invention provides an exposure adjusting method, including the exposure detecting step of detecting an exposure level based on image information obtained by picking-up an image of an object, the light emission quantity determining step of determining the quantity of light emission by a light source provided in advance for emitting light to the object, and the difference detecting step of detecting a difference between an exposure level detected by the exposure detecting step with the light source emitting light with the quantity of light emission as determined by the light emission quantity determining step and an exposure level detected by the exposure detecting step without light emission by the light source. In the light emission quantity determining step, the quantity of light emission is determined to attain the optimal exposure level, based on the difference detected in the difference detecting step.

The portable device according to a still further aspect of the present invention having an image pick-up unit picking-up an image of an object and outputting image information further includes a light source emitting light to the object, a storing unit storing image data corresponding to the image information, a shutter key, and control means. When the image pick-up mode is set, the control means stores the image data corresponding to the image information in the storing unit in response to an operation of the shutter key, and in accordance with the exposure level based on the image information, starts emission of the light source, regardless of the operation of the shutter key.

Therefore, even when the brightness between the object and the image pick-up unit is insufficient, the object image can be picked-up while monitoring the object, without requiring any special operation by the user.

Preferably, the control means sets the light source to a non-emission state, in accordance with the exposure level based on the image information, regardless of the operation of the shutter key, after the start of light emission by the light source.

Therefore, in the image pick-up mode, even when the distance between the object and the image pick-up unit or the portable device varies, or even when the brightness between the object and the image pick-up unit varies, it is possible to have the exposure level always matching the optimal level.

Preferably, a display unit for displaying various pieces of information is further provided, and the control means has the image data corresponding to the image information displayed on the display unit, when the image pick-up mode is set. Therefore, it is possible for the user to monitor the image at the display unit while picking-up an image of the object by a camera.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 shows, in the form of a table, range of total exposure value 31 with respect to the brightness of a space between camera 9 and object 44.

FIG. 9 represents exemplary contents of a table TB.

DESCRIPTION OF THE PREFERRED EMBODIMENTS

Embodiments of the present invention will be described in the following with reference to the figures.

Figure 1:
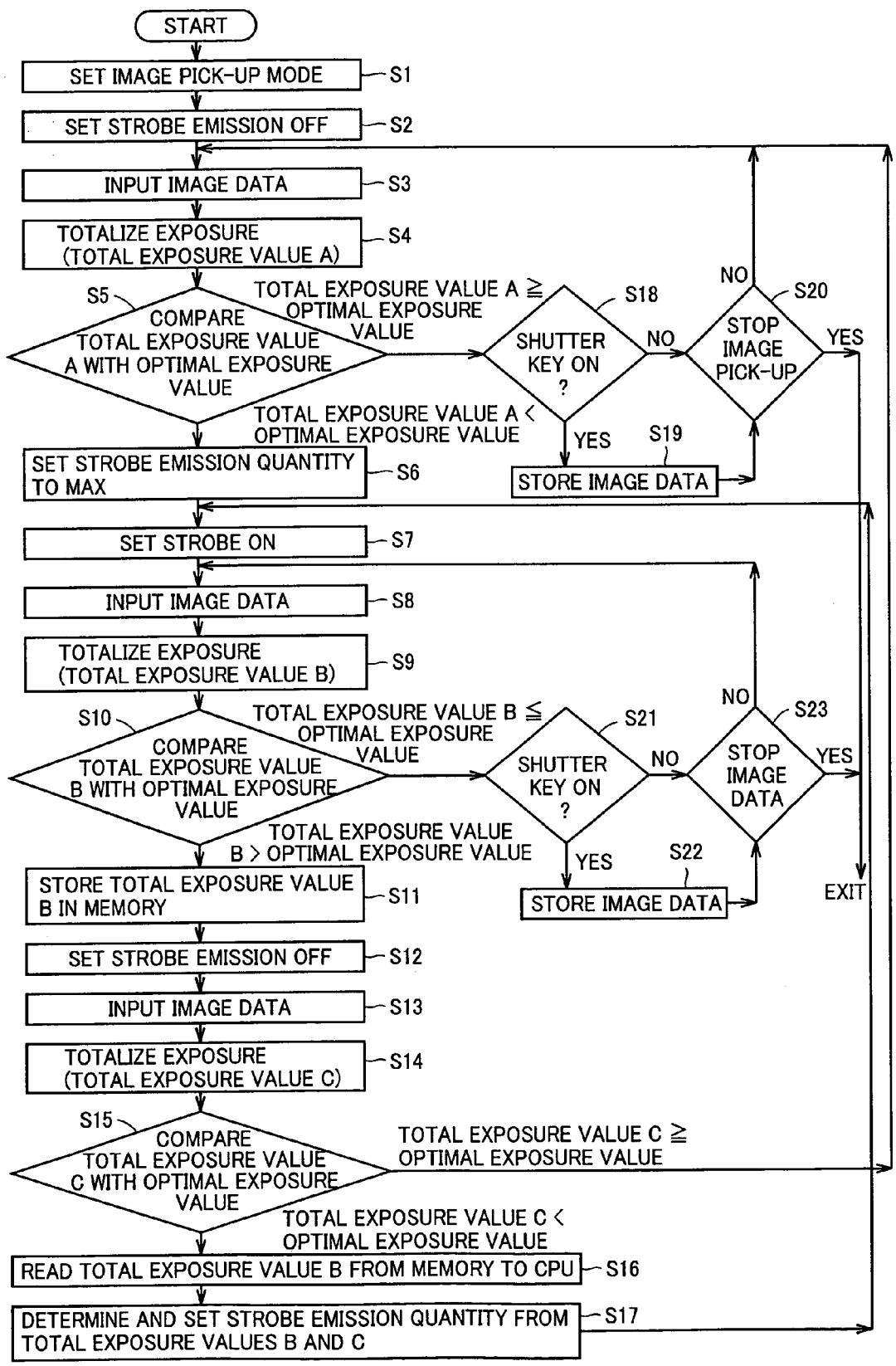
FIG. 1 is a flow chart of an exposure level control procedure in the image pick-up mode in accordance with an embodiment of the present invention.

FIG. 1 shows an exposure level control procedure in the image pick-up mode in accordance with an embodiment of the present invention.

Figure 2A:
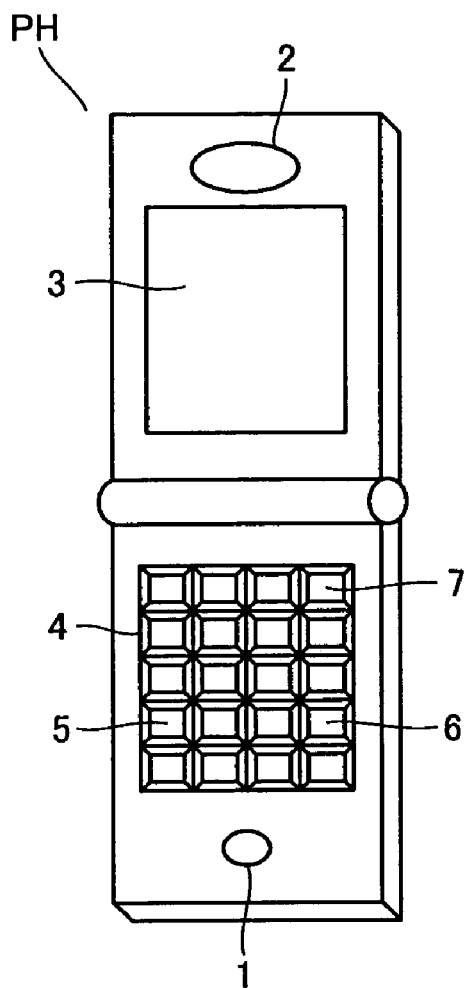
FIGS. 2A and 2B show appearance of a portable cameraphone PH in accordance with an embodiment.
Figure 2B:
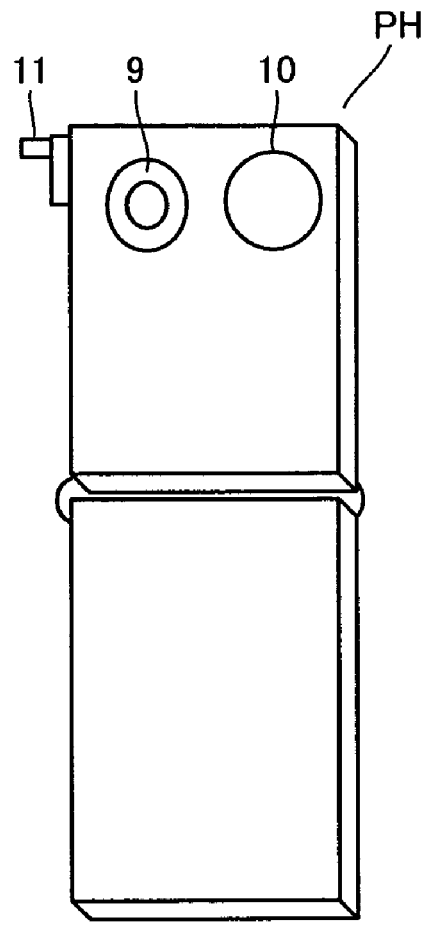

FIGS. 2A and 2B show an appearance of the portable camera-phone PH in accordance with the present embodiment. Referring to FIG. 2A, on the front surface, portable camera-phone PH is provided with a microphone 1 for voice communication, a speaker 2 for sound output, an LCD (Liquid Crystal Display) 3 for displaying various information, and operation key unit 4 having various keys to be operated by a user arranged thereon. Further, referring to FIG. 2B, on the back surface, portable camera-phone PH is provided with a camera 9 for picking-up images of an object, and a strobe 10 functioning as an auxiliary light source at the time of an image pick-up. On a side surface, the camera-phone further includes a mode switching lever that is operated by a user.

Image pick-up by camera 9 is either in a close-up mode or a non-close-up mode (hereinafter referred to as a normal mode). Mode switching lever 11 is operated to switch operation either to the close-up mode or the normal mode. The normal mode is suitable for picking up an image of a normal object 44, while in the close-up mode, camera 9 (lens 91 as will be described later) is positioned close to the object 44 such as bar-codes, to pick-up the image thereof at a relatively close distance to read information precisely from the image data. When the operation is switched to the close-up mode, the distance between lens 91 and a CCD array of a CCD circuit 92, which will be described later, is changed such that the image of object 44 is appropriately formed on the CCD array.

Operation key unit 4 includes an ON/OFF key 5 operated to turn ON/OFF light emission of strobe 10, a shutter key 6 that is turned ON (pressed) to activate a shutter operation of camera 9, and a strobe key 7 pressed to instruct light emission of strobe 10.

Figure 3:
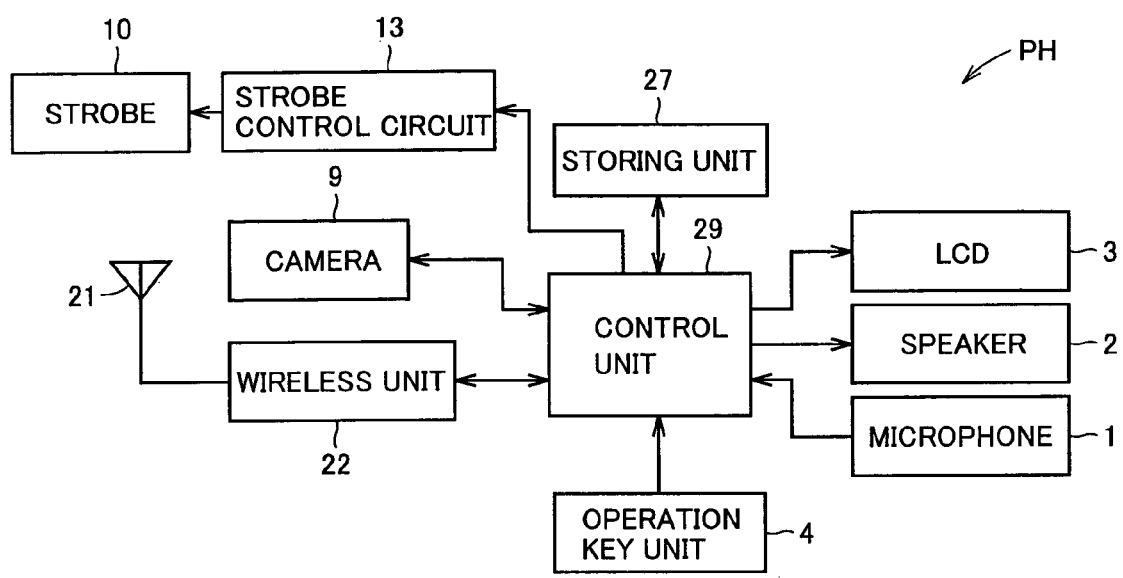
FIG. 3 shows a schematic configuration of the portable camera phone PH.

FIG. 3 is a schematic block diagram representing the configuration of portable camera-phone PH. Referring to FIG. 3, portable camera-phone PH includes a control unit 29, and microphone 1, speaker 2, LCD 3, operation key unit 4 and camera 9 described above, that are connected to control unit 29. Portable camera-phone PH further includes an antenna 21 transmitting and receiving radio wave, a wireless unit 22 controlling radio communication through antenna 21 in accordance with an instruction from control unit 29, a strobe control circuit 13 controlling light emission operation of strobe 10 in accordance with an instruction from control unit 29, and a storing unit 27 storing information including image data 34, which will be described later. As shutter key 6 is operated from the outside for instructing storage of image data 34 to storing unit 27, the timing at which the image data 34 is stored in storing unit 27 is the same as the timing of ON operation of shutter key 6.

Figure 4:
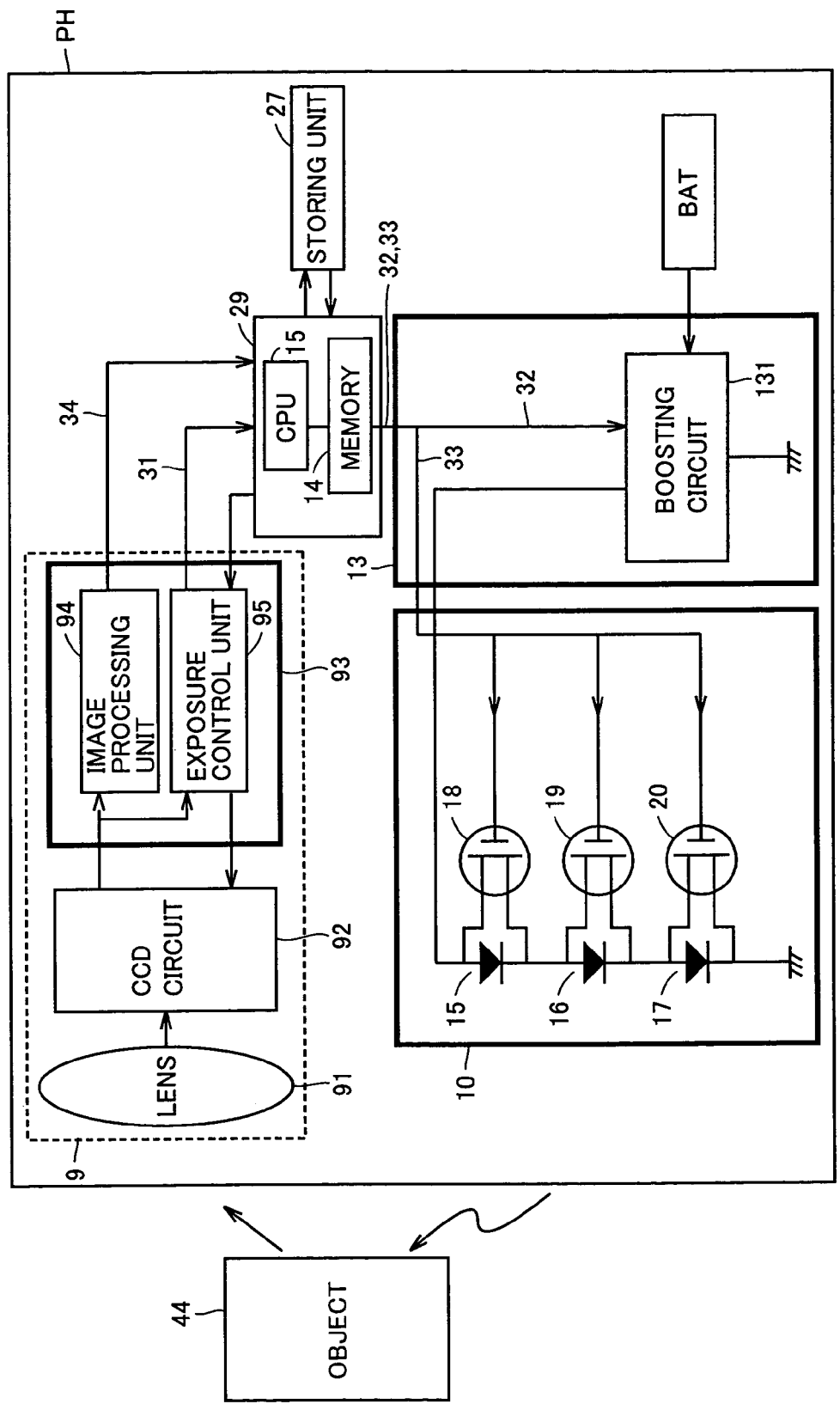
FIG. 4 shows a circuit configuration related to a camera 9 and a strobe 10 of the portable camera phone PH.

FIG. 4 shows a circuit configuration related to camera 9 and strobe 10 of the portable camera phone PH. Referring to FIG. 4, camera 9 includes a lens 91, a CCD circuit 92 consisting of a CCD (Charge Coupled Device) array, receiving light reflected from object 44 through lens 91 and outputting an image signal that is an electric signal in accordance with the received light level, and an image circuit 93 receiving as an input the image signal from CCD circuit 92, performing a prescribed process on the input image signal, and outputting image data 34 and total exposure value 31. Image circuit 93 includes an image processing unit 94 that performs, on the input image signal, white balance adjustment, γ correction, color signal processing, luminance signal processing or the like, converts the result to image data 34 in the form of digital signals and outputs the same, and an exposure control unit 95 outputting total exposure value 31 of the input image signals.

Figure 5:
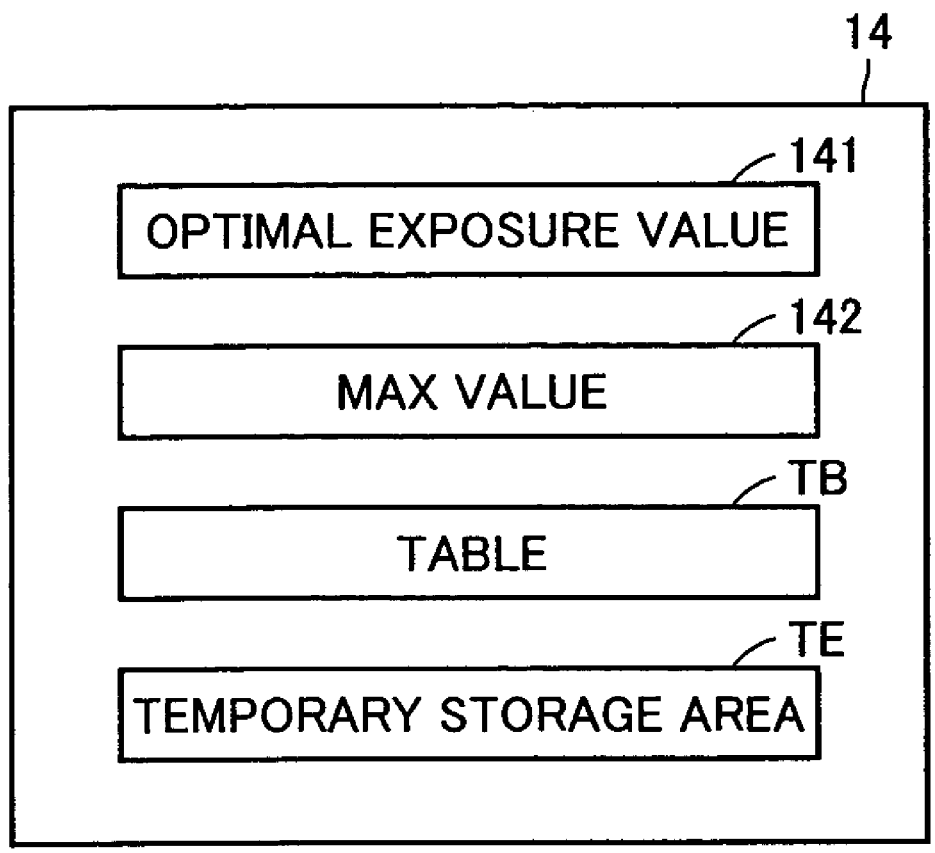
FIG. 5 shows exemplary contents of a memory 14.

Control unit 29 has a CPU (Central Processing Unit) 15 and a memory 14 storing various pieces of information. When image data 34 is input, CPU 15 executes various processes including a process for displaying the image on LCD 3. Therefore, it is possible for the user to monitor the image on the screen of LCD 3 while picking-up an image of object 44 by camera 9. Memory 14 stores, in advance, optimal exposure value 141, MAX value 142 representing the maximum level of light emission that can be attained by strobe 10 and a table TB as can be seen from FIG. 5, and it has an area TE for temporarily storing data. The optimal exposure value 141 represents an exposure value that is optimal for camera 9 of portable camera-phone PH to pick-up an image. In other words, it represents the target value of luminance signal level among the image signals of object 44. MAX value 142 represents the maximum quantity of light emission when strobe 10 is ON (lit).

Exposure control unit 95 calculates total exposure value 31 of the image signals successively input from CCD circuit 92, and outputs the calculated value to control unit 29. Specifically, when strobe 10 is turned ON (lit) and images are to be picked-up using strobe 10 as an auxiliary light source, a sum of luminance signal levels of image signals input from CCD circuit 92 is calculated frame by frame, and the sums of a plurality of frames are totaled. The resulting value is referred to as the total exposure value 31, and quantity of light emission by strobe 10 is controlled to attain the optimal exposure value, based on the total exposure value 31.

When images are to be picked-up while strobe 10 is OFF, exposure control unit 95 calculates the total exposure value described above in the similar manner, and receives the optimal exposure value 141 read by CPU 15 from memory 14. Then, exposure control unit 95 applies a control signal for exposure correction to CCD 92, so that the total exposure values attains to the optimal exposure value 141.

The strobe control circuit 13 has a boosting circuit 131, to which a voltage to drive strobe 10 is supplied from a battery BAT.

CPU 15 of control unit 29 compares the optimal exposure value 141 stored in memory 14 with total exposure value 31 input from exposure control unit 95, and based on the result of comparison, outputs boosting control signal 32 and an ON/OFF signal 33 to strobe control circuit 13, whereby the light emission operation of strobe 10 is controlled through strobe control circuit 13.

Referring to FIG. 4, strobe 10 includes an LED (Light Emitting Diode) 15 emitting red light, an LED 16 emitting green light, an LED 17 emitting blue light and switching FETs (Field Effect Transistors) 18 to 20 corresponding to the LEDs 15 to 17, respectively. Based on the boosting control signal 32 applied from CPU 15, boosting circuit 131 boosts the voltage applied from battery BAT to a level for driving LEDs 15 to 17. Boosting circuit 131 has a function of controlling a constant current circuit and the current thereof such that an output has a constant current level based on the boosting control signal 32. LEDs 15 to 17 are connected in series to an output of boosting circuit 131, switching FETs 18 to 20 are connected in parallel to corresponding LEDs 15 to 17, respectively, and to the gates of FETs 18 to 20, ON/OFF control signal 33 from CPU 15 is supplied. As the gates of FETs 18 to 20 are individually turned ON/OFF by the ON/OFF control signal 33, no current flows from boosting circuit 131 to the LED having the gate of the corresponding FET turned ON as both ends are short-circuited. The current from boosting circuit 131 flows, in the forward direction, only to that LED having the gate of the corresponding FET turned OFF, and the LED emits light. Therefore, when FETs 18 to 20 are all turned OFF by ON/OFF control signal 33, currents are supplied in the forward direction simultaneously to LEDs 15 to 17, whereby the LEDs emit light simultaneously and hence white illumination light is emitted.

By applying pulse-wise voltages to FETs 18 to 20 by ON/OFF control signal 33 and by changing the pulse width thereof, the quantity of light emission of LEDs 15 to 17 can be adjusted.

Though three LEDs 15 to 17 are described as connected in series here, these may be connected in parallel.

Figure 6:
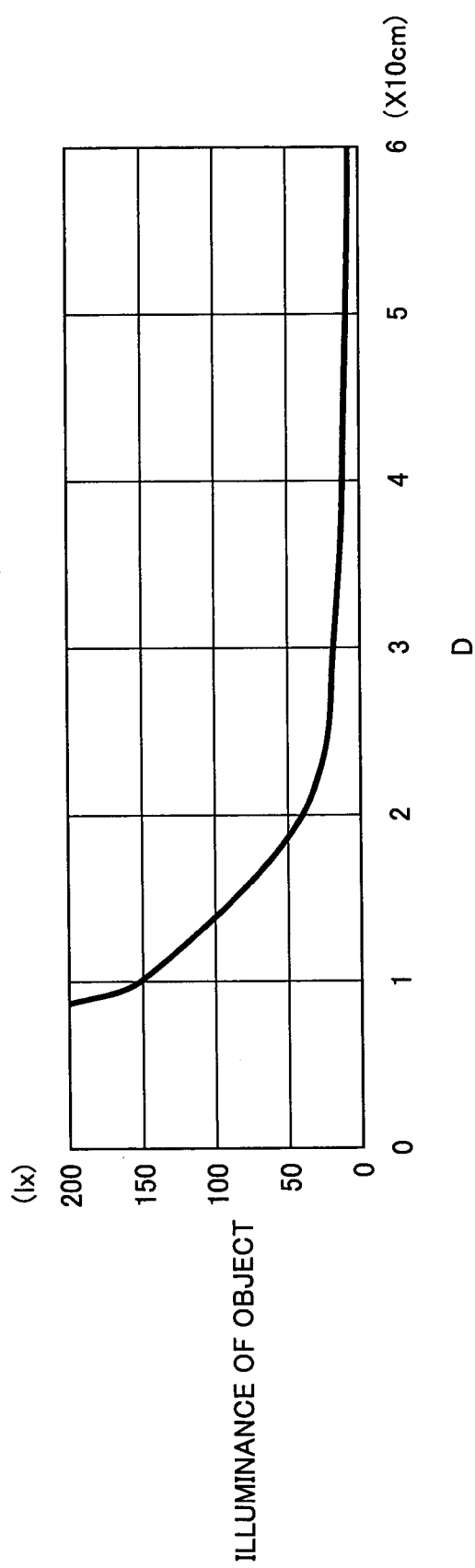
FIG. 6 represents a relation between distance D from camera 9 to an object 44 and illuminance of object 44, when strobe 10 emits light.

FIG. 6 represents a relation between distance D (unit: ×10 cm) from camera 9 to an object 44 and illuminance (unit: lx) of object 44, when strobe 10 emits light, assuming that the object 44 is white and that illumination level by the natural light other than the strobe light emission does not vary on the object 44. As can be seen, when the distance D is small, the illuminance of object 44 is sufficiently high, and as the distance D increases, the illuminance of object 44 decreases.

Figure 7:
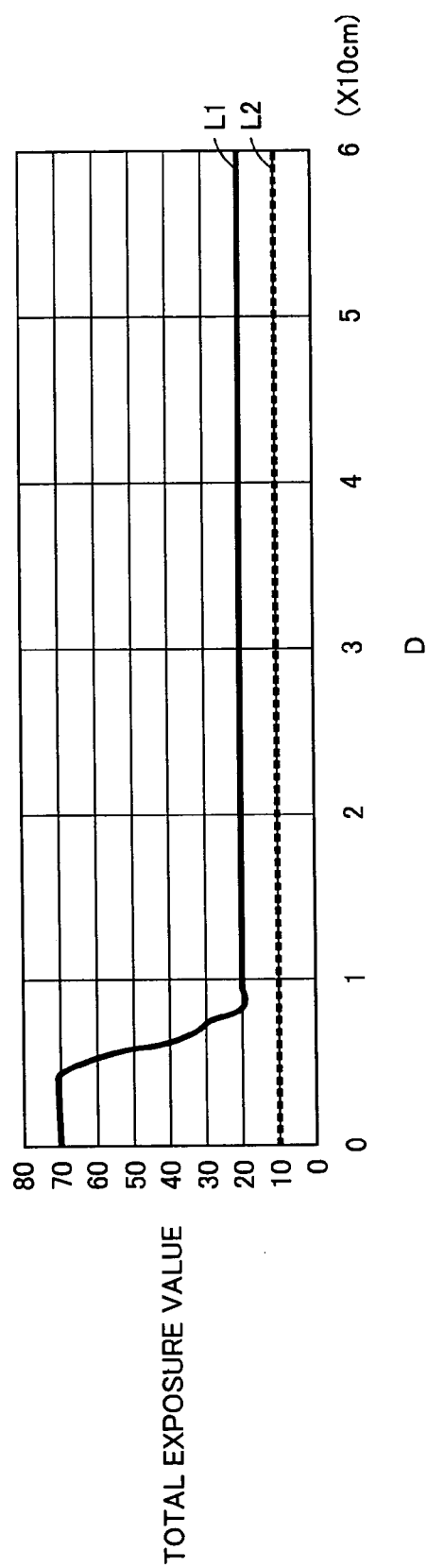
FIG. 7 represents relation between total exposure value 31 and distance D from camera 9 to object 44, when strobe 10 emits light (ON) and strobe 10 does not emit light (OFF).

FIG. 7 represents relations between total exposure value 31 and the distance D from camera 9 to an object 44, by a solid line L1 when strobe 10 emits light (ON) and a dotted line L2 when strobe 10 does not emit light (OFF), assuming that the object 44 is white and that illumination level by the natural light other than strobe light emission does not vary on the object 44. The relations represented by the solid line L1 and the dotted line L2 of FIG. 7 hold, regardless of whether the image pick-up operation is in the close-up mode or normal mode.

It can be seen from FIG. 7 that when strobe 10 emits light and the distance D is small, total exposure value 31 is considerably large, and total exposure value 31 becomes smaller as the distance D increases. When strobe 10 is off, total exposure value 31 does not change, regardless of the distance D. Therefore, there is a correspondence between the difference in total exposure values 31 given by the solid line L1 and the dotted line L2 and the distance D.

FIG. 8 represents, in the form of a table, the range of total exposure value 31 with respect to brightness of a space between camera 9 and object 44. As can be seen from FIG. 8, when the brightness between camera 9 and object 44 is the optimal brightness (target brightness), the total exposure value 31 for the image signals picked-up and output by camera 9 is in the range of 19 to 21. If it is not the optimal brightness, the total exposure value 31 is smaller than or larger than this range of 19 to 21. Therefore, here, the range of 19 to 21 is set as the optimal exposure value 141.

FIG. 9 represents exemplary contents of the table TB mentioned previously. In table TB shown in FIG. 9, a plurality of differences DF and quantities of light emission LM corresponding to respective differences DF are registered. The difference DF represents the difference between the total exposure value B that is the total exposure value 31 when strobe 10 is ON and the total exposure value C that is the total exposure value 31 when strobe 10 is OFF. The quantity of light emission LM represents quantity of light emission that is to be output from strobe 10 in order to have the total exposure value 31 attain to the level of the optimal exposure value 141 when the corresponding difference DF is detected.

According to the contents of table TB shown in FIG. 9, when the difference DF is smaller, that is, when the distance D between camera 9 and object 44 is larger, as shown in FIG. 7, the quantity of light emission LM of strobe 10 is made larger, so as to prevent under-exposure. On the other hand, when the difference DF is larger, that is, when the distance D from camera 9 and object 44 as shown n FIG. 7 is smaller (when the camera is closer to the object 44), the quantity of light emission by strobe 10 is made smaller to prevent over-exposure. Therefore, in FIG. 9, when the difference DF is the smallest (0~10), the quantity of light emission LM is set to the maximum value MAX 142, and when the difference DF is the largest (66~70), the quantity of light emission LM is set to the minimum value.

Figure 10:
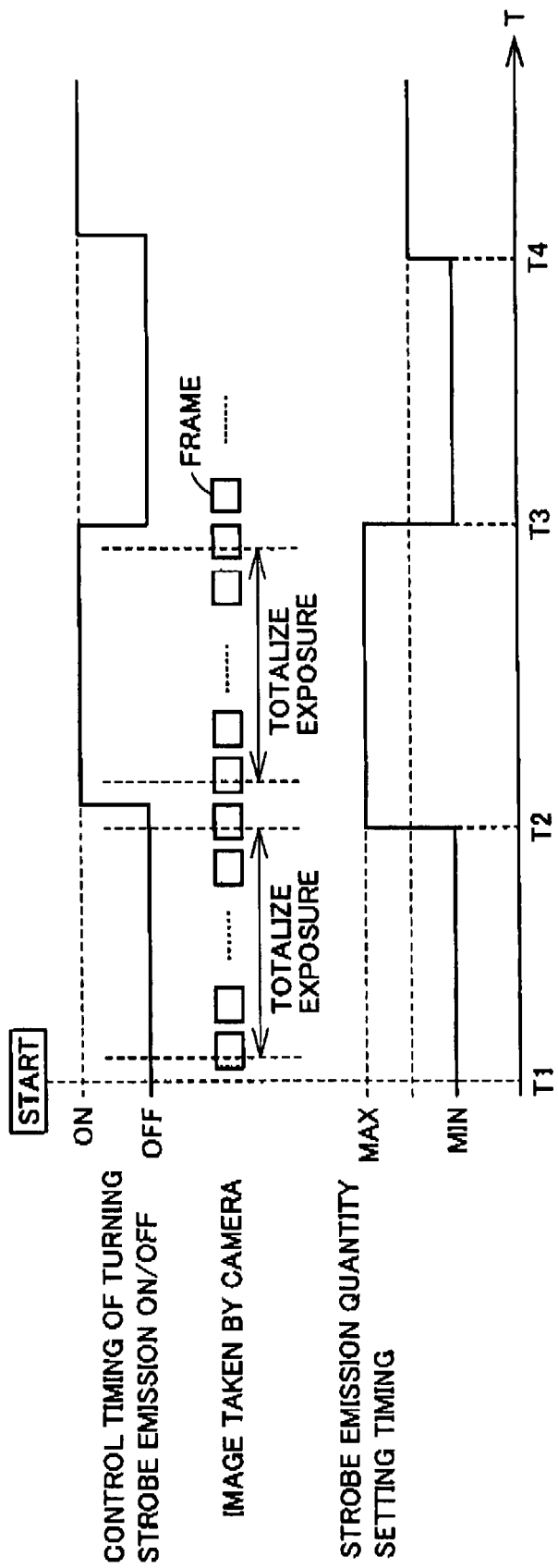
FIG. 10 shows a sequence of ON/OFF control of strobe 10 in accordance with the procedure of FIG. 1.

FIG. 10 shows a sequence of ON/OFF control of strobe 10 along with time T, in accordance with the procedure of FIG. 1. The operation in accordance with the procedure of FIG. 1 will be described with reference to FIG. 10.

First, mode switching lever 11 is operated and the operation mode is set either to the normal mode or the close-up mode (step (hereinafter simply represented by S) 1).

Thereafter, the user presses an emission ON/OFF key 5 (S2), and CPU 15 starts exposure adjustment while performing ON/OFF control of strobe 10 in accordance with the sequence of FIG. 10. Specifically, first, the boosting control signal 32 and ON/OFF control signal 33 are output, and strobe 10 is set to OFF to prevent light emission at timing T1 of FIG. 10 (S2). An image of object 44 is picked-up by camera 9 in this state, and therefore, CPU 15 receives as inputs the image data 34 and total exposure value 31 (S3, S4). The total exposure value 31 input at this time will be the total exposure value A.

CPU 15 reads optimal exposure value 141 from memory 14, and compares the read optimal exposure value 141 with total exposure value A (S5). When it is the case from the result of comparison that total exposure value A≧optimal exposure value 141, it means that sufficient exposure value is attained without emission of strobe 10. Therefore, CPU 15 determines that image data 34 can be stored in storing unit 27, and determines whether shutter key 6 is tuned ON by the user or not (S18). When it is determined that shutter key 6 is turned ON, CPU 15 stores the image data 34 input at this time to storing unit 27 (S19). Thereafter, whether the image pick-up mode is terminated or not is determined (S20). If it is determined to be terminated (YES in S20), the series of processes is terminated (EXIT). Otherwise (NO in S20), the flow returns to the process of S3, the next image data 34 is input and the following steps are repeated in the similar manner.

As described above, in the image pick-up mode, whether the exposure value at the time of image pick-up is sufficient or not is detected without emission of strobe 10, and if it is sufficient, image pick-up is done without emission of strobe 10. Therefore, wasteful power consumption of battery BAT can be avoided.

When it is determined that total exposure value A<optimal exposure value 141, that is, the exposure is insufficient, CPU 15 proceeds to (activates) the process following S6, in which the quantity of light emission is determined based on the difference between the total exposure value 31 calculated with light emission of strobe 10 and the total exposure value 31 calculated without light emission of strobe 10.

First, the quantity of light emission by strobe 10 is set to the MAX value 142 (S6). Specifically, MAX value 142 is read from memory 14, and boosting control signal 32 and ON/OFF signal 33 in accordance with the read MAX value 142 are generated and output to strobe control circuit 13. Accordingly, at timing T2 of FIG. 10, strobe 10 emits light at the level in accordance with the MAX value 142 in accordance with ON/OFF signal 33 under the control of strobe control circuit 13 (S7).

CPU 15 receives as inputs image data 34 at this time and total exposure value 31 of the image data 34 (S8, S9). The total exposure value 31 input here will be total exposure value B.

CPU 15 compares total exposure value B with optimal exposure value 141 read from memory 14 (S10). When it is determined from the result of comparison that total exposure value B≦optimal exposure value 141, then whether shutter key 6 is turned ON or not is determined (S21). When it is determined that shutter key 6 is turned ON, CPU 15 stores the input image data 34 to storing unit 27 (S22). Thereafter, whether the image pick-up mode is terminated or not is determined (S23). If it is determined to be terminated (YES in S23), the series of processes is terminated (EXIT). Otherwise (NO in S23), the next image data 34 is input (S8) and the following steps are repeated in the similar manner.

Therefore, when strobe 10 is turned ON immediately after it is turned OFF, strobe 10 emits light with the MAX value 142, and therefore, appropriate brightness, that is, appropriate exposure level can quickly be attained when, for example, an image is to be picked-up in the dark.

When it is determined that total exposure value B>optimal exposure value 141, that is, when it is determined that if strobe 10 were emitted at the level in accordance with MAX value 142, exposure would be excessive and the state of image pick-up is inappropriate, CPU 15 proceeds to the following process, in order to eliminate the state of over-exposure and to attain appropriate exposure value.

Specifically, CPU 15 stores the total exposure value B in a temporary storage area TE of memory 14 (S11), and controls (S12) strobe 10 such that emission of strobe 10 is turned OFF by boosting control signal 32 and ON/OFF control signal 33 at timing T3 of FIG. 10. Thereafter, CPU 15 receives as inputs image data 34 and total exposure value 31 of the image data 34 (S13, S14). The input total exposure value 31 will be total exposure value C.

CPU 15 compares total exposure value C with the optimal exposure value 141 read from memory 14 (S15), and when it is determined from the result of comparison that total exposure value C≧optimal exposure value 141, the flow returns to the process of S3 and the following processes are repeated in the similar manner.

When it is determined from the result of comparison that total exposure value C<optimal exposure value 141, it is determined that if the emission of strobe 10 were turned OFF, sufficient exposure value would not be attained, resulting in under-exposure. Accordingly, quantity of light emission by strobe 10 is determined in accordance with the exposure value when strobe emission is off, and emission of strobe 10 is controlled by boosting control signal 32 and ON/OFF control signal 33. Specifically, CPU 15 calculates a difference between the total exposure value B read from temporary storage area TE that represents the exposure when strobe 10 is turned ON with the MAX value 142 and the total exposure value C representing the exposure with strobe 10 OFF, and based on the difference, CPU 15 looks up the table TB, determines the corresponding quantity of strobe emission LM and reads the quantity (S17). Thus, the quantity of strobe emission can be determined simply by looking up the table TB.

Boosting control signal 32 and ON/OFF signal 33 are generated and output in accordance with the strobe emission quantity LM so that strobe 10 emits light with the read strobe emission quantity LM. Therefore, at timing T4 of FIG. 10, strobe 10 emits light at the level of the emission quantity LM that corresponds to the difference DF (S7). Thereafter, the process is repeated in the similar manner.

In this manner, in such a situation that if strobe 10 were simply turned ON and emitted, exposure would be excessive and if the strobe were turned OFF and natural light only were used, exposure would be insufficient, the light emission quantity LM of strobe 10 is determined such that total exposure value 31 matches the optimal exposure value 141, based on the difference between the total exposure value B when the strobe is ON and the total exposure value C when the strobe is OFF. The determination is made with reference to two values, that is, the total exposure value B when the strobe is ON and the total exposure value C when the strobe is OFF. Therefore, as compared with a determination made with reference to only one value, the light emission quantity LM that attains the optimal exposure value 141 can be determined more accurately. Further, the two total exposure values B and C are relative (opposing) values that represent the total exposure values with and without emission of strobe 10, and therefore, the light emission quantity can be determined more accurately as compared with a determination using two total exposure values with emission of strobe 10 or two total exposure values without emission of strobe 10.

Further, as can be seen from FIG. 7, the difference between total exposure value B with the strobe ON and total exposure value C with the strobe OFF varies as the distance D between camera 9 and object 44 varies. Therefore, determination of the light emission quantity LM of strobe 10 in accordance with this difference enables determination of light emission quantity LM that realizes the optimal exposure value 141 reflecting the distance D.

When an image of object 44 is to be picked-up using camera 9 of portable camera-phone PH, the user picks-up an image of object 44 while monitoring an image on LCD 3, with the portable camera-phone PH itself held and moved by the user's hand. Therefore, at the time of image pick-up, when the operation is switched from the close-up mode to the normal mode or vice versa, and the distance between object 44 and camera 9 changes all the time, the light emission quantity of strobe 10 can be adjusted to always attain the optimal exposure value, following the variation in the distance D, as described above.

In this manner, the light emission quantity is adjusted to always attain the optimal state of exposure in the image pick-up mode, and therefore it is possible to know the operation timing of shutter key 6 from the monitor image on LCD 3. Further, whether the image is well focused or not can quickly be confirmed, and hence, it is possible for the user to switch between the close-up mode and the normal mode appropriately.

An image pick-up in the close-up mode will be described in the following. The portable camera-phone PH shown in FIG. 3 has a function of connecting to the Internet, not shown, by communication through wireless unit 22 and antenna 21. For the connection to the Internet, it is necessary to obtain information related to URL (Uniform Resource Locators). In accordance with the present embodiment, the URL information can be obtained by CPU 15 analyzing image data 34 of a bar code as the object 44 picked-up in the close-up mode.

When a bar code is to be picked-up in the close-up mode, camera 9 (portable camera-phone PH) itself is brought close to the bar code, and hence the space between the bar code and camera 9 becomes dark. The light emission quantity LM of strobe 10, however, can be adjusted. Accordingly, any defocus can be corrected immediately. As a result, the URL information can accurately be read from image data 34 of the bar code.

Though optimal exposure value 141 is fixed in the present embodiment, it may be changed arbitrarily. By way of example, a user may wish to pick-up an image of an object with not the optimal exposure level but a brighter level, or a darker level. To meet such a demand, the optimal exposure value 141 may variably set in accordance with the user's request.

Though LEDs are used for strobe 10 in the present embodiment, other light source may be used.

Though strobe 10 emits white light as red, green and blue lights are emitted simultaneously, the color of emission is not limited.

Further, the shape of portable camera-phone PH is not limited to the one in accordance with the present embodiment shown in FIG. 2.

Though an example in which the exposure adjusting function using a strobe is applied to a portable camera-phone PH has been described in the present embodiment, the portable device to which the function may be applied is not limited thereto. By way of example, a digital camera using a strobe, a PDA (Personal Digital Assistant) having a camera with strobe may also be possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A portable device having an image pickup unit picking-up an image of an object and outputting image information, comprising:
    a light source emitting light to said object;
    a control unit for controlling an emission by said light source based on quantity of light emission, in an image pick-up mode; and
    an exposure detecting unit for detecting exposure level based on said image information; wherein
    said control unit includes
    a light emission quantity determining unit for determining said quantity of light emission,
    a comparing unit for detecting a difference by comparing said exposure level detected by said exposure detecting unit with said light source emitting light based on said light emission quantity determined by said light emission quantity determining unit and said exposure level detected by said exposure detecting unit with said light source not emitting light; and
    said light emission quantity determining unit determines said light emission quantity based on said difference detected by said comparing unit, to have said exposure level match an optimal level; and
    said comparing unit and said light emission quantity determining unit are activated repeatedly for a single image pick-up operation until said exposure level detected by said exposure detecting unit matches the optimal level; and wherein
    said exposure detecting unit detects said exposure level with said light source emitting light based on said light emission quantity determined by said light emission quantity determining unit, and immediately thereafter said exposure detecting unit detects said exposure level with said light source not emitting light.

2. The portable device having an image pickup unit according to claim 1, wherein
    said optimal level is a target exposure level for said image information.

3. The portable device having an image pick-up unit according to claim 1, further comprising
    a storing unit storing image data corresponding to said image information; wherein
    when said exposure level detected by said exposure detecting unit matches said optimal level, said image data is stored in said storing unit.

4. The portable device having an image pickup unit according to claim 1, further comprising
    a shutter key operated from outside the portable device to instruct storage of said image data to a storing unit; wherein
    a shutter key operation status is determined, the status determination triggered when said exposure level detected by said exposure detecting unit matches said optimal level.

5. The portable device having an image pick up unit according to claim 1, wherein
    said control unit further includes
    starting state setting unit for setting said light source to a non-emission state at a start of said image pick-up mode, and
    start level determining unit for determining whether said exposure level detected by said exposure detecting unit in said non-emission state set by said starting state setting unit matches said optimal level or not; wherein
    when it is determined by said start level determining unit that the exposure level does not match, said light emission quantity determining unit and said comparing unit are activated.

6. The portable device having an image pickup unit according to claim 5, wherein
    when it is determined by said start level determining unit that the exposure level does not match, said light emission quantity determining unit determines said light emission quantity to be the maximum quantity that can be emitted by said light source.

7. The portable device having an image pick-up unit according to claim 1, wherein
    said image pick-up mode includes a close-up mode and a non-close-up mode that are switchable.

8. A portable device having an image pick-up unit picking-up an image of an object and outputting image information, comprising:
    a light source emitting light to said object;
    control unit for controlling an emission by said light source based on a first quantity of light emission, in an image pick-up mode; and
    exposure detecting unit for detecting exposure level based on said image information; wherein
    said control unit includes
    a light emission quantity determining unit for determining said first quantity of light emission, and
    a comparing unit for detecting a first difference by comparing said exposure level detected by said exposure detecting unit with said light source emitting light based on said first light emission quantity determined by said light emission quantity determining unit and said exposure level detected by said exposure detecting unit with said light source not emitting light; and
    said light emission quantity determining unit determines said first light emission quantity based on said first difference detected by said comparing unit, and includes a table having a plurality of reference light emission quantities and a plurality of reference differences, the reference light emission quantities registered respectively corresponding to each of said reference differences;
    said comparing unit and said light emission quantity determining unit are activated repeatedly for a single image pick-up operation until said exposure level detected by said exposure detecting unit matches a target exposure level; and
    said table is looked-up based on said first difference detected by said comparing unit to read corresponding said first light emission quantity.

9. An exposure adjusting device, comprising;
an exposure detecting unit for detecting an exposure level based on image information obtained by picking-up an image of an object;
a light emission quantity determining unit for determining, in an image pick-up mode, a light emission quantity of a light source provided in advance for emitting light to said object; and
a comparing unit for detecting a difference by comparing said exposure level detected by said exposure detecting unit with said light source emitting light based on said light emission quantity determined by said light emission quantity determining unit and said exposure level detected by said exposure detecting unit with said light source not emitting light; wherein
said light emission quantity determining unit determines said light emission quantity based on said difference detected by said comparing unit, to have said exposure level match an optimal level,
said comparing unit and said light emission quantity determining unit are activated repeatedly for a single image pick-up operation until said exposure level detected by said exposure detecting unit matches the optimal level, and
said exposure detecting unit detects said exposure level with said light source emitting light based on said light emission quantity determined by said light emission quantity determining unit, and immediately thereafter said exposure detecting unit detects said exposure level with said light source not emitting light.

10. The exposure adjusting device according to claim 9, wherein
said optimal level is a target exposure level for said image information.

11. The exposure adjusting device according to claim 9, further comprising:
starting state setting unit for setting said light source to a non-emission state at a start of said image pick-up mode, and
start level determining unit for determining whether said exposure level detected by said exposure detecting unit in said non-emission state set by said starting state setting unit matches said optimal level or not; wherein
when it is determined by said start level determining unit that the exposure level does not match, said light emission quantity determining unit and said comparing unit are activated.

12. The exposure adjusting device according to claim 11, wherein
when it is determined by said start level determining unit that the exposure level does not match, said light emission quantity determining unit determines said light emission quantity to be the maximum quantity that can be emitted by said light source.

13. The exposure adjusting device according to claim 9, wherein
said image pick-up mode includes a close-up mode and a non-close-up mode that are switchable.

14. An exposure adjusting device, comprising:
an exposure detecting unit for detecting an exposure level based on image information obtained by picking-up an image of an object;
a light emission quantity determining unit for determining, in an image pick-up mode, a first light emission quantity of a light source provided in advance for emitting light to said object; and
a comparing unit for detecting a first difference by comparing said exposure level detected by said exposure detecting unit with said light source emitting light based on said first light emission quantity determined by said light emission quantity determining unit and said exposure level detected by said exposure detecting unit with said light source not emitting light; wherein
said light emission quantity determining unit determines said first light emission quantity based on said first difference detected by said comparing unit, and includes a table having a plurality of reference light emission quantities and a plurality of reference differences, the reference light emission quantities registered respectively corresponding to each of said reference differences;
said comparing unit and said light emission quantity determining unit are activated repeatedly for a single image pick-up operation until said exposure level detected by said exposure detecting unit matches a target exposure level; and
said table is looked-up based on said first difference detected by said comparing unit to read corresponding said first light emission quantity.

15. A portable device having an image pick-up unit picking-up an image of an object and outputting image information, comprising:
a light source emitting light to said object;
a storing unit storing image date corresponding to said image information;
a shutter key; and
a control unit storing image data corresponding to said image information in said storing unit in response to an operation of said shutter key, and when an image pick-up mode is set, starting emission of light of said light source automatically in accordance with an exposure level based on said image information regardless of an operation of said shutter key.

16. The portable device having an image pick-up unit according to claim 15, wherein
said control unit stops emission of said light source in accordance with the exposure level based on said image information regardless of the operation of said shutter key, in a state after emission of said light source is started.

17. The portable device having an image pick-up unit according to claim 16, farther comprising
a display unit for displaying various pieces of information; wherein
said control unit displays image data corresponding to said image information on said display unit when said image pick-up mode is set.

18. The portable device having an image pick-up unit according to claim 15, further comprising
a display unit for displaying various pieces of information; wherein
said control unit displays image data corresponding to said image information on said display unit when said image pick-up mode is set.

* * * * *

UNITED STATES PATENT AND TRADEMARK OFFICE
CERTIFICATE OF CORRECTION

PATENT NO. : 7,414,666 B2  Page 1 of 1
APPLICATION NO. : 10/622697
DATED : August 19, 2008
INVENTOR(S) : Kazunari Yamauchi It is certified that error appears in the above-identified patent and that said Letters Patent is hereby corrected as shown below:

On the title page item 75:

Inventor: Kazunari Yamaguchi, Higashihiroshima (JP)

should be

Inventor: Kazunari Yamauchi, Higashihiroshima (JP)

AND item 12 the inventor name in the top left corner should be changed from

Yamaguchi to

Yamauchi

Signed and Sealed this

Twenty-seventh Day of January, 2009

JOHN DOLL
*Acting Director of the United States Patent and Trademark Office*